(12) United States Patent
Brosnan (10) Patent No.: US 8,189,954 B2
(45) Date of Patent: May 29, 2012

(54) SYSTEM AND METHOD FOR PERFORMING OPTICAL NAVIGATION USING ENHANCED FRAMES OF IMAGE DATA

(75) Inventor: Michael J. Brosnan, Fremont, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 791 days.

(21) Appl. No.: 12/362,663

(22) Filed: Jan. 30, 2009

(65) Prior Publication Data

US 2010/0195935 A1    Aug. 5, 2010

(51) Int. Cl.
    *G06K 9/36* (2006.01)
(52) U.S. Cl. ....... 382/275; 382/260; 382/274; 358/3.26; 358/3.27

(58) Field of Classification Search .......... 382/260, 382/274, 275
See application file for complete search history.

(56) References Cited

U.S. PATENT DOCUMENTS

| | | | | |
|---|---|---|---|---|
| 5,767,922 A * | 6/1998 | Zabih et al. | | 348/700 |
| 6,463,175 B1 * | 10/2002 | Lee | | 382/190 |
| 7,227,621 B2 * | 6/2007 | Lee et al. | | 356/28 |
| 7,576,332 B2 * | 8/2009 | Britten | | 250/393 |
| 2005/0206614 A1 | 9/2005 | Brosnan et al. | | |

\* cited by examiner

Primary Examiner — Yosef Kassa (57) ABSTRACT

A system and method for performing optical navigation uses a spatial noise pattern estimate of the spatial noise pattern in captured frames of image data caused by contamination on at least one component of the system to substantially remove the spatial noise pattern in the captured frames of image data before the captured frames of image data are used for displacement estimation.

20 Claims, 6 Drawing Sheets

SYSTEM AND METHOD FOR PERFORMING OPTICAL NAVIGATION USING ENHANCED FRAMES OF IMAGE DATA

BACKGROUND OF THE INVENTION

Optical navigation systems operate to estimate movements between the optical navigation systems and target surfaces to perform tracking operations. An optical navigation system uses a light source, such as a light-emitting diode (LED) or a laser diode, to illuminate a region of a target surface and an image sensor to receive the light reflected from the target surface to successively capture frames of image data of the target surface. The optical navigation system compares the successive image frames and estimates the relative movements between the optical navigation system and the target surface based on the comparison between the current image frame and a previous image frame. The comparison is based on detecting and computing displacements of features in the captured frames of image data.

Optical navigation systems are commonly used in optical computer mice to track the movements of the mice relative to the navigation surfaces on which the mice are manually manipulated. The movements of a computer mouse are used to control a cursor on a monitor of a computer system. The accuracy of an optical computer mouse with respect to the positioning of the cursor depends on the quality of image frames of a navigation surface that are captured for image comparisons.

A concern with a conventional optical computer mouse is that contamination of dust and/or other material on the optical elements of the mouse introduces a spatial noise pattern in the captured image frames of the navigation surface. These image frames with optical spatial noise pattern can lead to displacement calculation errors, which may degrade the tracking performance of the optical computer mouse. Another concern is that intensity variations in the captured frames of image data due to manufacturing deviations in the image sensor and/or other electrical components of the optical navigation system may also degrade the tracking performance of the optical computer mouse.

In view of these concerns, there is a need for a system and method to address the spatial noise pattern due to optical and electrical sources in the frames of image data that are used for displacement estimation.

SUMMARY OF THE INVENTION

A system and method for performing optical navigation uses an estimate of the spatial noise pattern in captured frames of image data caused by contamination on at least one component of the system to substantially remove the spatial noise pattern in the captured frames of image data before the captured frames of image data are used for displacement estimation.

A system for optical navigation in accordance with an embodiment of the invention comprises an image sensor configured to capture frames of image data of a target surface, a spatial noise pattern estimation module configured to produce a spatial noise pattern estimate of a spatial noise pattern in the captured frames of image data caused by contamination on at least one component of the system using at least some of the captured frames of image data, a normalization module configured to normalize particular frames of image data using the spatial noise pattern estimate to substantially remove the spatial noise pattern from the particular frames of image data to produce normalized frames of image data, and a navigation engine configured to generate displacement values based on the normalized frames of image data.

A method for performing optical navigation in accordance with an embodiment of the invention comprises capturing frames of image data of a target surface, producing a spatial noise pattern estimate of a spatial noise pattern in the captured frame of image data caused by contamination on at least one component used to capture the frames of image data, normalizing particular frames of image data using the spatial noise pattern estimate to substantially remove the spatial noise pattern from the particular frames of image data to produce normalized frames of image data, and generating displacement values based on the normalized frames of image data.

A method for performing optical navigation in accordance with another embodiment of the invention comprises capturing frames of image data of a target surface, each of the captured frames of image data including a plurality of pixel values, producing a spatial noise pattern estimate of a spatial noise pattern in the captured frame of image data caused by contamination on at least one component used to capture the frames of image data, wherein the producing of the spatial noise pattern estimate includes averaging the pixel values of some of the captured frames of image data, normalizing particular frames of image data using the spatial noise pattern estimate to substantially remove the spatial noise pattern from the particular frames of image data to produce normalized frames of image data, and generating displacement values based on the normalized frames of image data.

Other aspects and advantages of the present invention will become apparent from the following detailed description, taken in conjunction with the accompanying drawings, illustrated by way of example of the principles of the invention.

DETAILED DESCRIPTION

Figure 1:
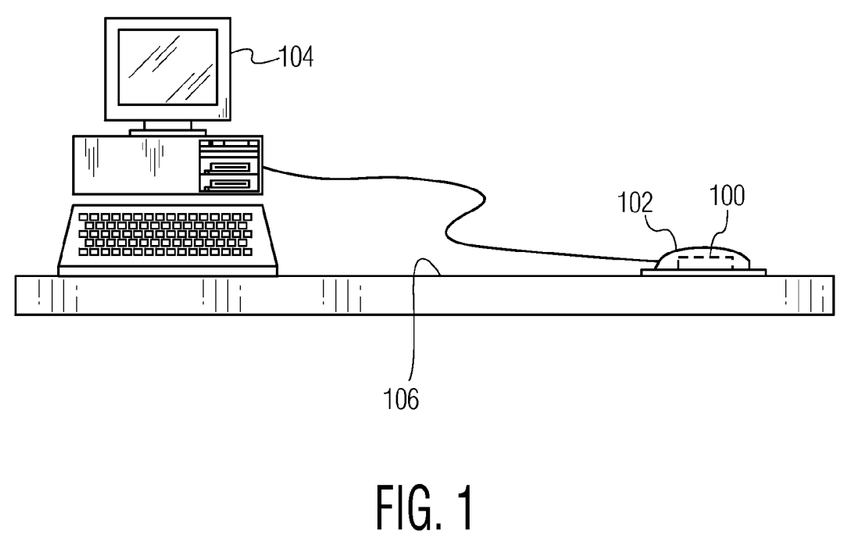
FIG. 1 shows an optical navigation system included in an optical computer mouse in accordance with an embodiment of the invention.

With reference to FIG. 1, an optical navigation system 100 in accordance with an embodiment of the invention is shown. As shown in FIG. 1, the optical navigation system 100 is included in an optical computer mouse 102, which is connected to a computer 104. In this implementation, the optical navigation system 100 is used to track the movements of the optical mouse 102 as the optical mouse is manipulated over a target surface 106 by a user to control a cursor displayed on the computer 104. However, in other implementations, the optical navigation system 100 can be used in different products for various tracking applications. As described in detail below, the optical navigation system 100 is configured to substantially remove the spatial noise pattern in frames of image data of the target surface so that the optical navigation system can properly track the relative movement of the optical mouse with respect the target surface even if the target surface is highly reflective surface, such as a glass surface or a granite surface.

Figure 2:
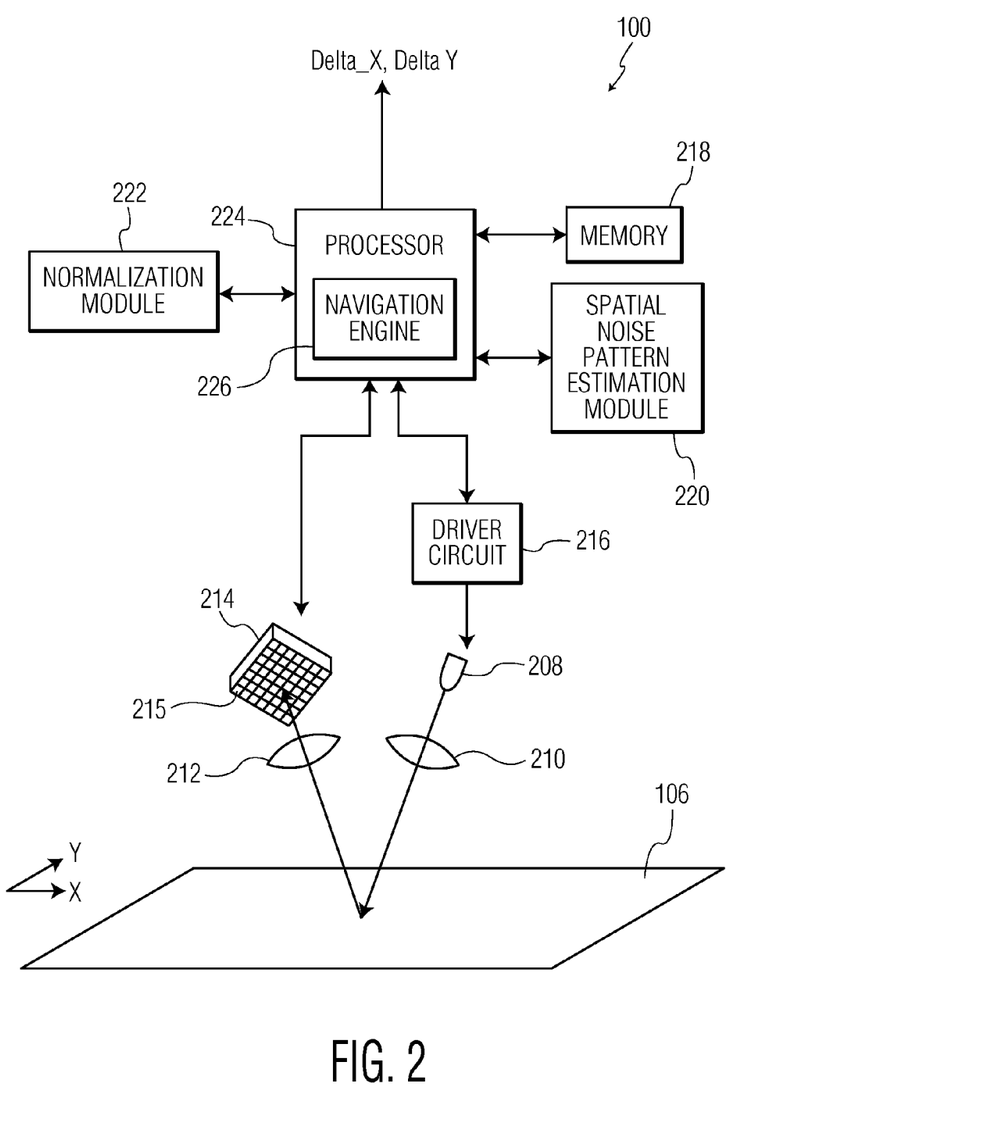
FIG. 2 is a diagram of the optical navigation system in accordance with an embodiment of the invention.

As shown in FIG. 2, the optical navigation system 100 includes a light source 208, a focusing lens 210, an imaging lens 212, an image sensor 214, a driver circuit 216, memory 218, a spatial noise pattern estimation module 220, a normalization module 222 and a processor 224 with a navigation engine 226. Although these components of the optical navigation system 100 are shown in FIG. 2 as being separate components, some of these components may be integrated. As an example, the image sensor 214, the driver circuit 216, the memory 218, the spatial noise pattern estimation module 220, the normalization module 222 and the processor 224 with the navigation engine 226 may be integrated into a single integrated circuit chip. Furthermore, some of the components of the optical navigation system 100, such as the navigation engine 226, the spatial noise pattern estimation module 220 and the normalization module 222 may be implemented in any combination software, hardware and/or firmware.

The light source 208 is configured to generate light in response to an applied driving signal. The light source 208 can be any type of a light emitting device, such as a light-emitting diode or a laser diode. As an example, the light source may be a vertical-cavity surface-emitting laser (VCSEL), which generates a coherent laser beam of light. The light source 208 is activated by the driver circuit 216, which provides driving signals to the light source. The focusing lens 210 is positioned between the light source 208 and the target surface 106 to focus the light from the light source onto a region of the target surface. The imaging lens 212 is positioned between the target surface 106 and the image sensor 214 to focus the light reflected off the target surface onto the image sensor.

The image sensor 214 is configured to capture frames of image data of the target surface 106 for displacement estimation. The image sensor 214 includes an array of photosensitive pixel elements 215 that generate image data in response to light incident on the elements. As an example, the image sensor 106 may be a charged-coupled device (CCD) image sensor or a complementary metal oxide semiconductor (CMOS) image sensor. The number of photosensitive pixel elements 215 included in the image sensor 214 may vary depending on at least the particular application of the optical navigation system 100. As an example, the image sensor 214 may include a 30×30 array of photosensitive pixel elements. At least some of the captured frames of image data are used by the spatial noise pattern estimation module 220 to create a spatial noise pattern estimate which is stored in the memory 218 to be used by normalization module 222. The memory 218 can be any type of read/writable memory, such as random access memory. Although the memory 218 is shown in FIG. 2 to be located outside of the processor 224, in other embodiments, the memory 218 may be located within the processor 224.

The spatial noise pattern estimation module 220 is configured to produce a spatial noise pattern estimate of the spatial noise pattern in the captured frames of image data caused by contamination on the optical elements of the optical navigation system 100, such as the focusing lens 210 and the imaging lens 212. In an embodiment, the spatial noise pattern estimation module 220 is configured to produce the spatial noise pattern estimate in the form of a spatial noise pattern estimation frame stored in the memory 218. The spatial noise pattern estimation frame is a frame of pixel values that includes a spatial noise pattern, which is created by the optical spatial noise caused by contamination on the optical elements of the system 100. Examples of contamination of the optical elements include dust, scratches, dirt and molding flaws in the bulk and on the surface of the lenses 210 and 212. The spatial noise pattern is substantially fixed since the contamination on the optical elements of the system 100 will tend to change slowly over time during typical usage of the optical mouse 102. The spatial noise pattern is introduced in the frames of image data of the target surface 106 that are captured by the image sensor 214. Consequently, if the captured frames of image data are used for estimation of relative displacement between the optical mouse 102 and the target surface 106 without taking into consideration the spatial noise pattern in the captured frames of image data, the resulting displacement estimation may include errors that may significantly degrade the tracking performance of the optical navigation system 100.

In an embodiment, the spatial noise pattern estimation frame is produced by averaging the pixel values from some of the captured frames of image data stored in the memory 218. As an example, the spatial noise pattern estimation frame can be produced by averaging the corresponding pixel values of the first N number of the captured frames of image data after an initial movement of the optical mouse 100 is detected, where N is an integer greater than one. As another example, the spatial noise pattern estimation frame can be produced by averaging the captured frames of image data which exhibit substantially different image brightness (e.g., +/−30%) than prior captured frames of image data. Still, as another example, the spatial noise pattern estimation frame can be produced by averaging the captured frames of image data obtained after substantial movement (e.g., 10 pixel movement) compared to prior captured frames of image data. Thus, in this embodiment, the size of the spatial noise pattern estimation frame is identical to the size of the captured frames of image data. That is, the spatial noise pattern estimation frame may include the same number of pixel values as the captured frames of image data. The spatial noise pattern estimation frame can be stored in, for example, the memory 218 or any other storage device.

After the spatial noise pattern estimation frame is produced, the spatial noise pattern estimation frame can be updated by the spatial noise pattern estimation module 220 using subsequently captured frames of image data of the target surface 106 so that any changes to the spatial noise pattern due to contamination changes are taken into account in the updated spatial noise pattern estimation frame. As an example, the spatial noise pattern estimation frame can be updated by averaging the current spatial noise pattern estimation frame with one or more subsequently captured frames of image data using different weights for the current spatial noise pattern estimation frame and the subsequently captured frames of image data. As an example, the current noise estimation can be given a weight of 0.99, while each of the subsequently captured frames of image data is given a weight of 0.01. When updating the spatial noise pattern estimation frame, not every captured frame of image data has to be used to update the spatial noise pattern estimation frame. In some embodiments, every M'th captured frame of image data can be used for the updating of the spatial noise pattern estimation frame, where M can be any integer greater than one. In other embodiments, a predetermined amount movement or image change is required before updating the spatial noise pattern estimation frame so as to prevent misinterpretation of navigation surface features as a spatial noise pattern.

The normalization module 222 is configured to normalize the current captured frame of image data using the latest spatial noise pattern estimation frame to substantially remove the spatial noise pattern in the current captured frame of image data. The normalization module 222 receives frames of image data captured by the image sensor 214 before the captured frames of image data are used for displacement estimation. The normalization module 222 also receives the latest spatial noise pattern estimation frame stored in the memory 218. For each captured frame of image data, the normalization module 222 uses the pixel values of the spatial noise pattern estimation frame as normalization parameters to substantially remove the spatial noise pattern in the captured frame of image data. As an example, each pixel value of the spatial noise pattern estimation frame may be used as a normalization factor to substantially remove the spatial noise pattern in the captured frames of image data. As another example, the pixel values of the spatial noise pattern estimation frame may be used to subtract the spatial noise pattern in the captured frames of image data. The normalized frames of image data are then transmitted to the processor 224 to be used for displacement estimation.

The processor 224 is configured to control the driver circuit 216 and the image sensor 214 in order to capture frames of image data of the target surface 106. The processor 224 is electrically connected to the driver circuit 216 and the image sensor 214 to provide control signals. The processor 224 provides control signals to the driver circuit 216 to direct the driver circuit to apply driving signals to the light source 208 to activate the light source. The processor 224 provides control signals to the image sensor 214 to accumulate electrical charges at the photosensitive pixel elements 215 and integrate at least some of the photosensitive pixel elements to produce each frame of image data of the target surface 106. Thus, the processor 224 is able to control the frame rate of the image sensor 214.

The processor 224 may be a general-purpose digital processor such as a microprocessor or microcontroller. In other embodiments, the processor 224 may be a special-purpose processor such as a digital signal processor. In still other embodiments, the processor 224 may be another type of controller or a field programmable gate array (FPGA).

The processor 224 includes the navigation engine 226, which is programmed into the processor in this embodiment. In other embodiments, the navigation engine 226 may be a separate component. The navigation engine 226 operates to correlate frames of image data captured by the image sensor 214 to estimate displacement changes between the optical navigation system 100 and the target surface 106 with respect to X and Y directions. If normalized frames of image data are available, the navigation engine 226 uses the normalized frames of image data for correlation so that the spatial noise pattern in the original captured frames of image data do not significantly affect the integrity of the displacement estimations.

The process of correlating frames of image data for displacement estimation or navigation is well known, and thus, is not described herein. The output of the navigation engine 220 includes directional delta X displacement values and directional delta Y displacement values. Each directional displacement value includes a negative or positive sign information, which indicates direction, and an absolute displacement value, which indicates the amount of displacement in that direction. In a particular implementation, the directional delta X and Y displacement values are generated in the form of two's complement binary numbers.

Figure 3:
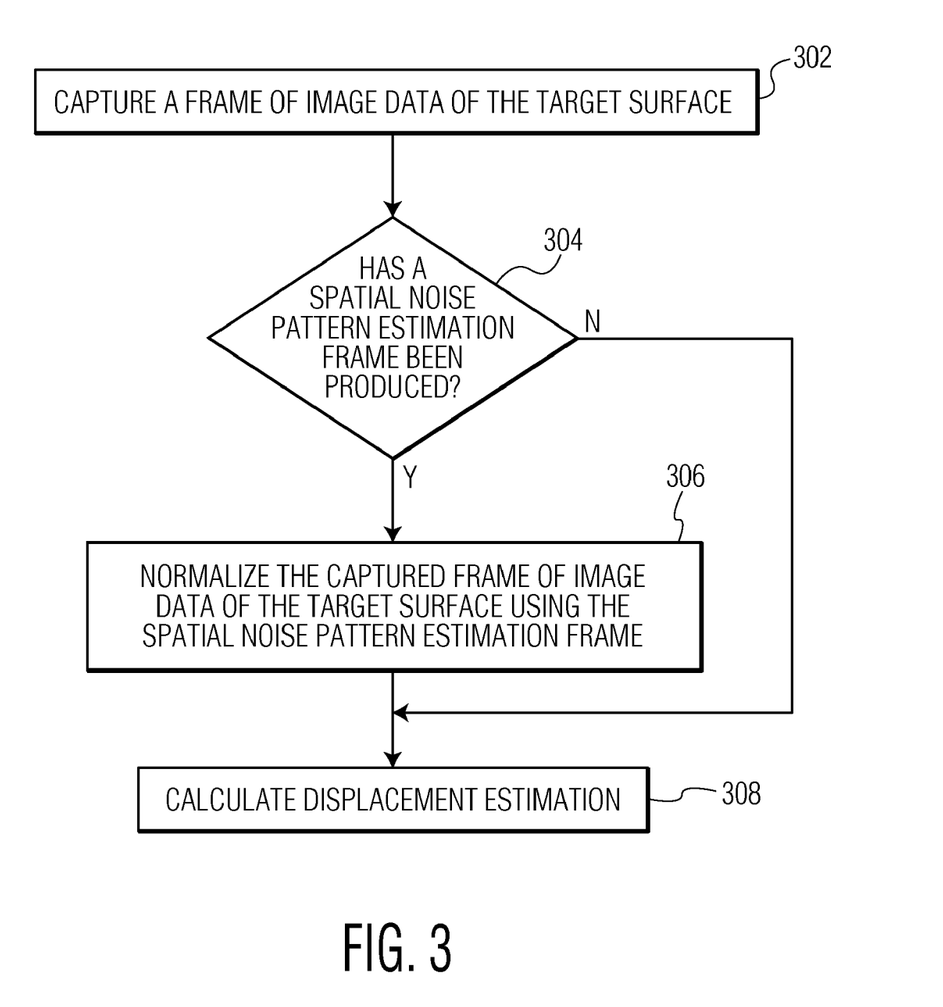
FIG. 3 is a process flow diagram of the operation of the optical navigation system of FIG. 2 in accordance with an embodiment of the invention.

The operation of the optical navigation system 100 in accordance with an embodiment of the invention is now described with reference to a process flow diagram of FIG. 3. At block 302, a frame of image data of the target surface 106 is captured. The process of capturing a frame of image data of a target surface involves the driver circuit 216 applying a driving signal to the light source 216, which emits light in response to the applied driving signal toward the target surface 106. The image sensor 214 receives the light reflected from the target surface 106 and produces the frame of image data of the target surface from the received light.

Next, at block 304, a determination is made whether a spatial noise pattern estimation frame has been produced. If yes, then the operation proceeds to block 306, where the captured frame of image data is normalized using the spatial noise pattern estimation frame. Next, at block 308, displacement estimation is calculated by the navigation engine 226 by correlating the normalized frame of image data to a previously normalized frame of image data.

However, if a noise estimation has not been produced (i.e., not enough frames of image data have been captured), then the operation proceeds directly to block 308, where displacement estimation is calculated by the navigation engine 226 by correlating the current frame of image data to a previous frame of image data.

Meanwhile, the current frame of image data is used to update the values stored in the memory 218 so that the current frame can be used to produce a spatial noise pattern estimation frame by the spatial noise pattern estimation module 220, as described above. After the spatial noise pattern estimation frame has been produced, the spatial noise pattern estimation frame can be updated using subsequently captured frames of image data, as described above.

In this embodiment, the optical navigation system 100 is designed to substantially remove a spatial noise pattern in the captured frames of image data that are caused by contamination on the optical elements of the system. However, in other embodiments, the optical navigation system 100 may be designed to correct intensity variations in captured frames of image data caused by manufacturing deviations in the image sensor 214 and/or other electrical components of the optical navigation system.

Figure 4:
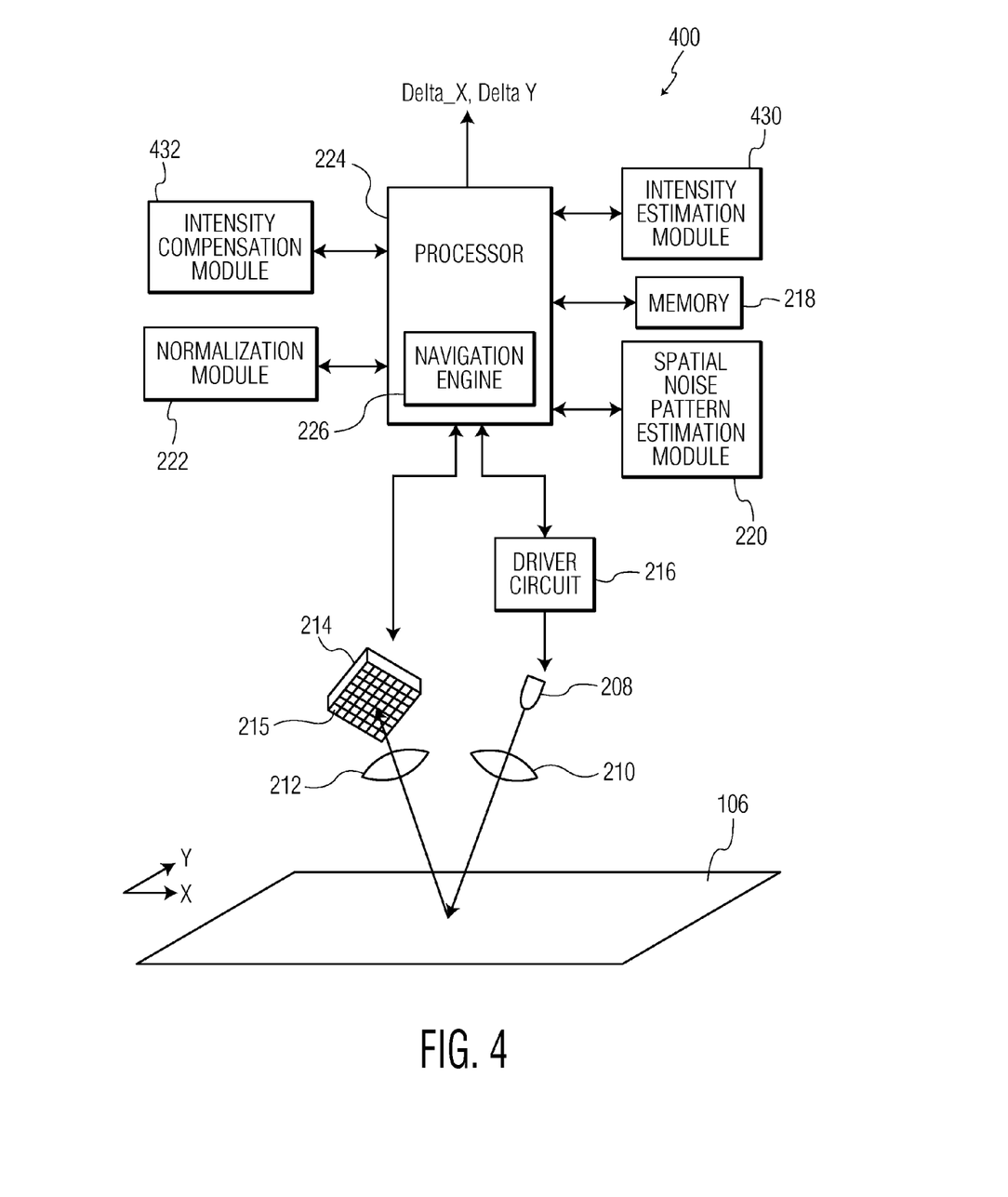
FIG. 4 is a diagram of the optical navigation system in accordance with another embodiment of the invention.

Turning now to FIG. 4, an optical navigation system 400 in accordance with another embodiment of the invention is shown. The optical navigation system 400 includes all of the components of the optical navigation system 100 of FIG. 1. However, the optical navigation system 400 also includes an intensity estimation module 430 and an intensity compensation module 432, which operate to compensate for intensity variations in the pixels of captured frames of image data due to manufacturing deviations in the image sensor 214 and/or other electrical components of the optical navigation system 400. As an example, if the image sensor 214 includes two image sensor arrays that are each connected to a separate analog-to-digital (ADC) converter, manufacturing deviations in the image sensor arrays and/or the ADCs, in particular, the field effect transistors in the ADCs, will produce fixed intensity variations in the frames of image data captured by the image sensor 214. These intensity variations, similar to the spatial noise pattern due to contamination, may affect the tracking performance of the optical navigation system 400. Thus, by compensating for these intensity variations, the optical navigation system 400 is able to improve its tracking performance.

The intensity estimation module 430 is configured to produce an intensity variation estimate using the captured frames of image data stored in the memory 218. The intensity variation estimate is an estimate of a fixed intensity pattern in the captured frames of image data caused by manufacturing deviations in the image sensor 214 and/or other electrical components of the optical navigation system 400. The intensity variation estimate is derived from the intensity information of the individual pixels of the captured frames of image data. Similar to the spatial noise pattern, the intensity pattern is substantially fixed since the causes of the intensity pattern are fixed. The fixed intensity pattern in the captured frames of image data of the target surface 106 can cause tracking errors, which may degrade the tracking performance of the optical navigation system 400.

In an embodiment, the intensity variation estimate is produced by averaging the intensity values from some or all of the captured frames of image data stored in the memory 218. The intensity variation estimate includes intensity information from each pixel of the captured frames of image data. Assuming that there are no manufacturing deviations in the image sensor 214 and other electrical components of the optical navigation system 400 and that there is no contamination on the optical elements of the optical navigation system, each average intensity value of the pixels of the captured frames of image data can be expected to approach a predefined value. Differences between different average intensity values of the pixels of the captured frames of image data can be attributed to intensity variations due to manufacturing deviations in the image sensor 214 and/or other electrical components of the optical navigation system 400. As an example, if there are intensity variations caused by differences between one half of the image sensor array and the other half of the image sensor array, these intensity variations will appear as differences in the intensity values of the corresponding pixels of the captured frames of image data. These differences in the intensity values of the pixels of the captured frames of image data are represented in the intensity variation estimate as intensity information for each pixel of a frame of image data captured by the image sensor 214. The intensity variation estimate is used to compensate for the intensity variations in the captured frames of image data before displacement estimation is computed using these frames of image data. The intensity variation estimate can be stored as data in, for example, the memory 218 or any other storage device. The intensity variation estimate can be continuously updated using the subsequently captured frames of image data.

The intensity compensation module 432 is configured to compensate for the intensity variations in the current captured frame of image data using the latest intensity variation estimate to balance the intensity variations caused by manufacturing deviations in the image sensor 214 and/or other electrical components of the optical navigation system 400. In this embodiment, the intensity compensation module 432 receives the normalized frames of image data and the latest intensity variation estimate to further process the normalized frames of image data to compensate for the intensity variations in the frames of image data. However, in other embodiments, the intensity compensation module 432 may first process the captured frames of image data to compensate for the intensity variations before the frames of image data are normalized by the normalization module 222 to substantially remove the spatial noise pattern.

For each captured frame of image data, the intensity compensation module 432 uses the intensity pixel values of the intensity variation estimate as parameters to compensate for the intensity variations in the captured frame of image data. As an example, each intensity pixel value of the intensity variation estimate may be used as a factor to increase or decrease the corresponding pixel value of the captured image data to smooth out the intensity variations. The processed frames of image data can then be used for displacement estimation by the navigation engine 226.

Figure 5:
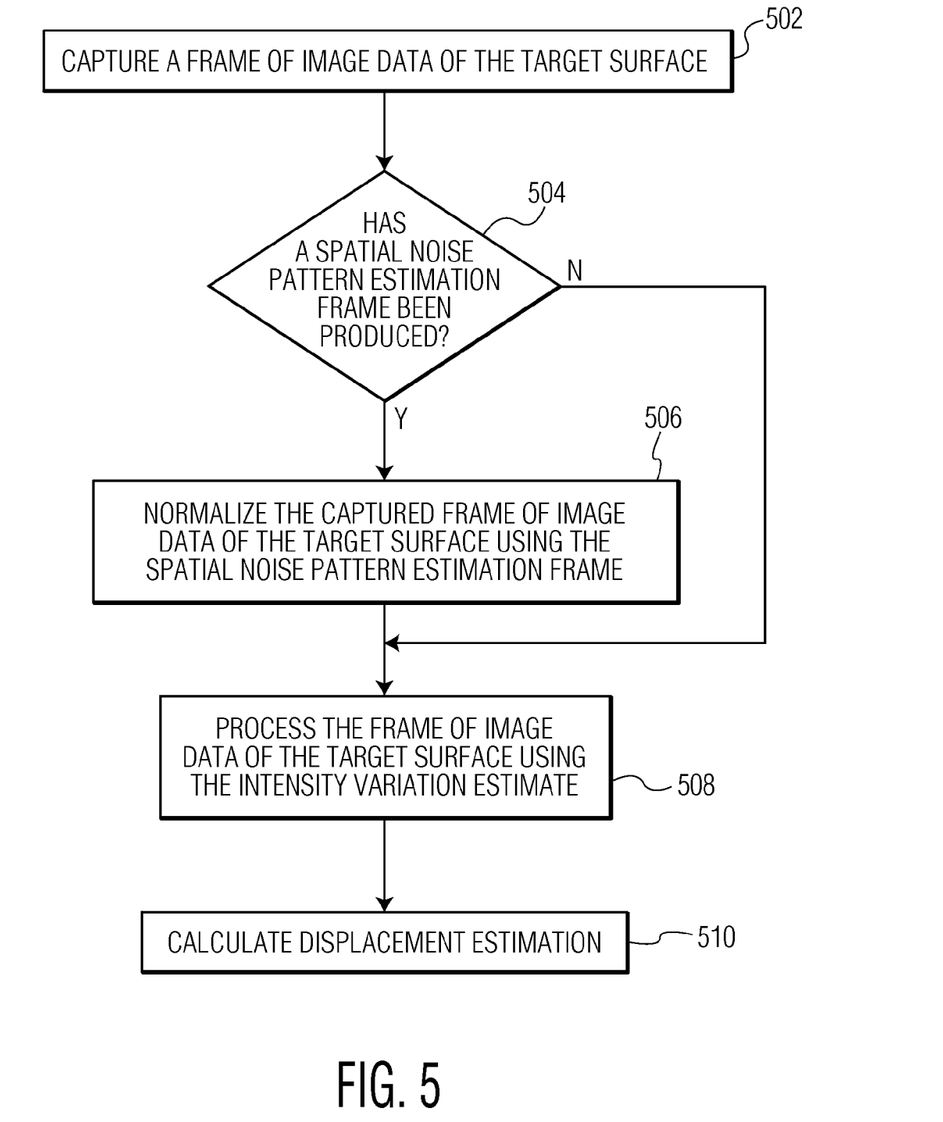
FIG. 5 is a process flow diagram of the operation of the optical navigation system of FIG. 4 in accordance with an embodiment of the invention.

The operation of the optical navigation system 400 in accordance with an embodiment of the invention is now described with reference to a process flow diagram of FIG. 5. At block 502, a frame of image data of the target surface 106 is captured. The process of capturing a frame of image data of a target surface involves the driver circuit 216 applying a driving signal to the light source 216, which emits light in response to the applied driving signal toward the target surface 106. The image sensor 214 receives the light reflected from the target surface 106 and produced the frame of image data of the target surface from the received light.

Next, at block 504, a determination is made whether a spatial noise pattern estimation frame has been produced. If yes, then the operation proceeds to block 506, where the captured frame of image data is normalized using the spatial noise pattern estimation frame. Next, at block 508, the normalized frame of image data is processed by the intensity compensation module 432 using the intensity variation estimate. Next, at block 510, displacement estimation is calculated by the navigation engine 226 by correlating the processed frame of image data to a previously processed frame of image data.

However, if a noise estimation has not been produced (i.e., not enough frames of image data have been captured), then the operation proceeds to block 508, where the captured frame of image data is processed by the intensity compensation module 432 using the intensity variation estimate. Next, at block 510, displacement estimation is calculated by the navigation engine 226 by correlating the current processed frame of image data to a previously processed frame of image data.

Meanwhile, the current frame of image data is stored in the memory 218 so that the current frame can be used to produce a spatial noise pattern estimation frame by the spatial noise pattern estimation module 220 module and to update the intensity variation estimate by the intensity estimation module 430, as described above. After the spatial noise pattern estimation frame has been produced, the spatial noise pattern estimation frame can be updated using subsequently captured frames of image data, as described above.

In this manner, the optical navigation system 400 is able to substantially remove the spatial noise pattern in the captured frames of image data due to contamination on the optical elements of the optical navigation system and to compensate for the intensity variations in the captured frames of image data due to manufacturing deviations in the image sensor 214 and/or other electrical components of the optical navigation system. Using these processed frames of image data for displacement estimation, the tracking performance of the optical navigation system 400 can be significantly improved.

Figure 6:
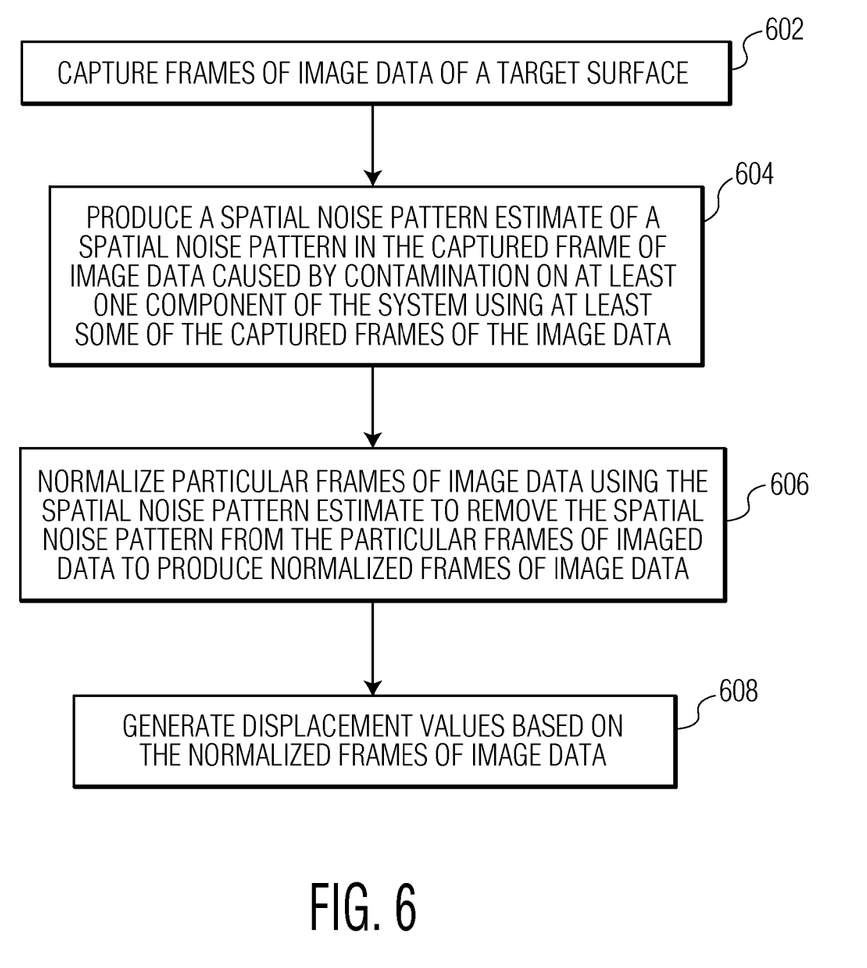
FIG. 6 is a process flow diagram of a method for performing optical navigation in accordance with an embodiment of the invention.

A method for performing optical navigation in accordance with an embodiment of the invention is described with reference to a flow diagram of FIG. 6. At block 602, frames of image data of a target surface are captured. Next, at block 604, a spatial noise pattern estimate of a spatial noise pattern in the captured frame of image data caused by contamination on at least one component of the system is produced using at least some of the captured frames of the image data. Next, at block 606, particular frames of image data are normalized using the spatial noise pattern estimate to substantially remove the spatial noise pattern from the particular frames of image data to produce normalized frames of image data. Next, at block 608, displacement values are generated based on the normalized frames of image data.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system for optical navigation comprising:
   an image sensor configured to capture frames of image data of a target surface;
   a spatial noise pattern estimation module configured to produce a spatial noise pattern estimate of a spatial noise pattern in the captured frames of image data caused by contamination on at least one component of the system using at least some of the captured frames of image data;
   a normalization module configured to normalize particular frames of image data using the spatial noise pattern estimate to substantially remove the spatial noise pattern from the particular frames of image data to produce normalized frames of image data; and
   a navigation engine configured to generate displacement values based on the normalized frames of image data.

2. The system of claim 1 wherein the spatial noise pattern estimation module is configured to average some of the captured frames of image data to produce the spatial noise pattern estimate.

3. The system of claim 2 wherein the spatial noise pattern estimation module is configured to average the first N number of the captured frames of image data after an initial movement is detected to produce the spatial noise pattern estimate, where N is an integer greater than one.

4. The system of claim 3 wherein the spatial noise pattern estimation module is configured to update the spatial noise pattern estimate using later captured frames of image data that were captured subsequent to the first N number of the captured frames of image data by weight averaging the later captured frames of image data and the spatial noise pattern estimate.

5. The system of claim 2 wherein the spatial noise pattern estimation module is configured to average the captured frames of image data which exhibit substantially different image brightness than prior captured frames of image data.

6. The system of claim 2 wherein the spatial noise pattern estimation module is configured to average the captured frames of image data obtained after substantial movement compared to prior captured frames of image data.

7. The system of claim 1 wherein the normalization module is configured to normalize the particular frames of image data using pixel values of the spatial noise pattern estimate as normalization factors for corresponding pixel values of the particular frames of image data.

8. The system of claim 1 further comprising:
   an intensity estimation module configured to produce an intensity variation estimate of intensity variations in the captured frames of image data caused by at least one electrical component using some of the captured frames of image data; and
   an intensity compensation module configured to compensate for the intensity variations in at least some of the captured frame of image data using the intensity variation estimate.

9. A method for performing optical navigation, the method comprising:
   capturing frames of image data of a target surface;
   producing a spatial noise pattern estimate of a spatial noise pattern in the captured frame of image data caused by contamination on at least one component used to capture the frames of image data;
   normalizing particular frames of image data using the spatial noise pattern estimate to substantially remove the spatial noise pattern from the particular frames of image data to produce normalized frames of image data; and
   generating displacement values based on the normalized frames of image data.

10. The method of claim 9 wherein the producing of the spatial noise pattern estimate includes averaging some of the captured frames of image data to produce the spatial noise pattern estimate.

11. The method of claim 10 wherein the averaging of some of the captured frames of image data includes averaging the first N number of the captured frames of image data after an initial movement is detected to produce the spatial noise pattern estimate, where N is an integer greater than one.

12. The method of claim 11 wherein the producing of the spatial noise pattern estimate includes updating the spatial noise pattern estimate using later captured frames of image data that were captured subsequent to the first N number of captured frames of image data by weight averaging the later captured frames of image data and the spatial noise pattern estimate.

13. The method of claim 9 wherein the normalizing of the particular frames of image data includes normalizing the particular frames of image data using pixel values of the spatial noise pattern estimate as normalization factors for corresponding pixel values of the particular frames of image data.

14. The method of claim 9 further comprising:
   producing an intensity variation estimate of intensity variations in the captured frames of image data caused by at least one electrical component using some of the captured frames of image data; and
   compensating the intensity variations in at least some of the captured frame of image data using the intensity variation estimate.

15. The method of claim 9 wherein the capturing of the frames of image data includes emitting light onto the target surface.

16. A method for performing optical navigation, the method comprising:
   capturing frames of image data of a target surface, each of the captured frames of image data including a plurality of pixel values;
   producing a spatial noise pattern estimate of a spatial noise pattern in the captured frame of image data caused by contamination on at least one component used to capture the frames of image data, wherein the producing of the spatial noise pattern estimate includes averaging the pixel values of some of the captured frames of image data;
   normalizing particular frames of image data using the spatial noise pattern estimate to substantially remove the spatial noise pattern from the particular frames of image data to produce normalized frames of image data; and
   generating displacement values based on the normalized frames of image data.

17. The method of claim 16 wherein the averaging of the pixel values of some of the captured frames of image data includes averaging the pixel values of the first N number of the captured frames of image data after an initial movement is detected to produce the spatial noise pattern estimate, where N is an integer greater than one.

18. The method of claim 17 wherein the producing of the spatial noise pattern estimate includes updating the spatial noise pattern estimate using later captured frames of image data that were captured subsequent to the first N number of captured frames of image data by weight averaging pixel values of the later captured frames of image data and values of the spatial noise pattern estimate.

19. The method of claim 16 wherein the normalizing of the particular frames of image data includes normalizing the particular frames of image data using pixel values of the spatial noise pattern estimate as normalization factors for corresponding pixel values of the particular frames of image data.

20. The method of claim 16 further comprising:
producing an intensity variation estimate of intensity variations in the captured frames of image data caused by at least one electrical component using some of the captured frames of image data; and
compensating the intensity variations in at least some of the captured frame of image data using the intensity variation estimate.

* * * * *